(12) United States Patent
Oka et al.

(10) Patent No.: US 9,309,352 B2
(45) Date of Patent: Apr. 12, 2016

(54) EPOXY RESIN COMPOSITION FOR RESIN TRANSFER MOLDING OF FIBER-REINFORCED COMPOSITE MATERIAL, FIBER-REINFORCED COMPOSITE MATERIAL, AND METHOD FOR PRODUCING SAME

(75) Inventors: Hideki Oka, Nagoya (JP); Nobuyuki Tomioka, Nagoya (JP); Shiro Honda, Nagoya (JP)

(73) Assignee: Toray Industries, Inc. (JP)

( * ) Notice: Subject to any disclaimer, the term of this patent is extended or adjusted under 35 U.S.C. 154(b) by 107 days.

(21) Appl. No.: 13/981,113

(22) PCT Filed: Jan. 20, 2012

(86) PCT No.: PCT/JP2012/051190
§ 371 (c)(1),
(2), (4) Date: Jul. 23, 2013

(87) PCT Pub. No.: WO2012/102202
PCT Pub. Date: Aug. 2, 2012

(65) Prior Publication Data
US 2013/0303661 A1    Nov. 14, 2013

(30) Foreign Application Priority Data

Jan. 27, 2011  (JP) ................................ 2011-015038

(51) Int. Cl.
| | |
|---|---|
| B29C 45/02 | (2006.01) |
| C08G 59/32 | (2006.01) |
| B29C 45/00 | (2006.01) |
| C08J 5/24 | (2006.01) |
| C08G 59/38 | (2006.01) |
| C08L 63/04 | (2006.01) |
| C08G 59/42 | (2006.01) |
| C08L 63/00 | (2006.01) |
| C08K 7/02 | (2006.01) |

(52) U.S. Cl.
CPC ........ *C08G 59/3218* (2013.01); *B29C 45/0005* (2013.01); *B29C 45/02* (2013.01); *C08G 59/38* (2013.01); *C08J 5/24* (2013.01); *C08L 63/04* (2013.01); *C08G 59/42* (2013.01); *C08J 2363/00* (2013.01); *C08K 7/02* (2013.01); *C08L 63/00* (2013.01)

(58) Field of Classification Search
None
See application file for complete search history.

(56) References Cited

U.S. PATENT DOCUMENTS

| | | | | |
|---|---|---|---|---|
| 5,942,182 A | * | 8/1999 | Hoge et al. ................... | 264/510 |
| 2005/0261397 A1 | * | 11/2005 | Ito ................................. | 523/400 |
| 2006/0009547 A1 | * | 1/2006 | Maeshima et al. ........... | 523/427 |
| 2009/0098447 A1 | * | 4/2009 | Murakami et al. ........... | 429/129 |
| 2009/0131556 A1 | * | 5/2009 | Honda et al. ................. | 523/207 |

FOREIGN PATENT DOCUMENTS

| | | | |
|---|---|---|---|
| JP | 59-155422 A | | 9/1984 |
| JP | 62-18421 A | * | 1/1987 |
| JP | 2-77419 A | * | 3/1990 |
| JP | 5-206523 A | * | 8/1993 |
| JP | 2001-500444 A | | 1/2001 |
| JP | 2004-204082 A | | 7/2004 |
| JP | 2007-31476 A | * | 2/2007 |
| JP | 2010-100730 A | | 5/2010 |
| WO | 01/92368 A1 | | 12/2001 |
| WO | 2007/125759 A1 | | 11/2007 |
| WO | WO 2007/125759 A1 | * | 11/2007 |
| WO | 2009/089145 A1 | | 7/2009 |

* cited by examiner

*Primary Examiner* — Robert Sellers
(74) *Attorney, Agent, or Firm* — DLA Piper LLP (US)

(57) ABSTRACT

An epoxy resin composition for RTM molding of a fiber-reinforced composite material includes [A] to [D] below, wherein [A]/[B], which is a blend mass ratio of [A] to [B], is in the range of 55/45 to 95/5: [A] a multifunctional epoxy resin that is liquid at normal temperature or has a softening point of 65° C. or lower, the multifunctional epoxy resin being at least one selected from phenol novolac epoxy resin, cresol novolac epoxy resin, and triphenylmethane epoxy resin; [B] an alicyclic epoxy resin; [C] an acid anhydride curing agent; and [D] a curing accelerator.

1 Claim, No Drawings

EPOXY RESIN COMPOSITION FOR RESIN TRANSFER MOLDING OF FIBER-REINFORCED COMPOSITE MATERIAL, FIBER-REINFORCED COMPOSITE MATERIAL, AND METHOD FOR PRODUCING SAME

TECHNICAL FIELD

This disclosure relates to an epoxy resin composition used for a fiber-reinforced composite material, and a fiber-reinforced composite material using the same.

BACKGROUND

Fiber-reinforced composite materials made of a reinforcing fiber and a matrix resin allows material design taking advantages of the reinforcing fiber and the matrix resin and, consequently, their use is expanding to the aerospace field, sports field, general industrial field, and the like.

As a reinforcing fiber, glass fibers, aramid fibers, carbon fibers, boron fibers, and the like are used. As a matrix resin, both thermosetting resins and thermoplastic resins are used, but thermosetting resins, which readily impregnate into a reinforcing fiber, are often used. As a thermosetting resin, epoxy resins, unsaturated polyester resins, vinyl ester resins, phenol resins, bismaleimide resins, cyanate resins, and the like are used.

To the production of a fiber-reinforced composite material, methods such as the prepreg method, hand lay-up method, filament winding method, pultrusion method, RTM (Resin Transfer Molding) method, and the like are applied.

In recent years, under circumstances where environmental regulation of automobiles has been tightened worldwide, automobile manufacturers both within the country and abroad have been making efforts toward weight saving of automobile bodies which influences fuel consumption performance, and use of carbon fiber composite materials whose weight is about half of iron and 70% of aluminum has been actively considered. Various parts for automobiles require high rigidity and strength properties as well as weight saving, and often have a three-dimensional complicated shape. Accordingly, the RTM method, which uses carbon fibers with high rigidity and high strength in the form of continuous fibers and is applicable to the complicated shape, is an effective molding method. The RTM method is a method in which a reinforcing fiber substrate is placed in a mold and then the mold is closed; a resin is injected through a resin inlet and impregnated into a reinforcing fiber and then the resin is cured; and the mold is opened and a molded article is taken out to thereby obtain a fiber-reinforced composite material. A key issue that arises in widespread use of carbon fiber composite materials in automobiles is productivity and, because of this obstacle, their use is limited in only some luxury automobiles. In addition, when using carbon fiber composite materials for automobile parts, the heat resistance in a painting process in which the temperature generally reaches 170° C. or higher must be considered.

To achieve such a high-level productivity and heat resistance using the RTM method, it is specifically required not only that the curing time of a resin be short but also that the following four conditions be simultaneously satisfied. First, in preparation operation of mixing resin materials, each material is a low-viscosity liquid and is excellent in mixing operability. Second, in the step of injecting a resin into a reinforcing fiber substrate, a resin composition is low-viscosity, and during the injection step, the increase in viscosity is reduced and the resin composition exhibits excellent impregnating ability. Third, sufficient high-speed curing can be achieved in a low-temperature range around 100° C., thereby allowing simplification of molding equipment and eliminating the need of heat resistance of subsidiary materials and the like, leading to cost reduction, and, at the same time, thermal contraction deriving from a temperature difference between a curing temperature and normal temperature can be reduced, whereby a molded article has excellent surface roughness. Fourth, in the mold release step after molding, the resin attains sufficient rigidity due to curing and can be released from the mold smoothly without causing strain; further, strain or deformation will not occur even after a painting process, and a molded article can be provided with high dimension accuracy.

To solve these problems, an epoxy resin composition that has sufficient impregnating ability because of its low viscosity and a small viscosity increase after mixing and exhibits high heat resistance after curing by using as a base resin a combination of bisphenol F epoxy resin, phenol novolac epoxy resin, and/or epoxy resin having at least three glycidyl groups in its molecule has been disclosed (JP 59-155422 A).

Also, an epoxy resin composition that has high flowability by using as a base resin a combination of alicyclic epoxy resin and cresol novolac epoxy resin has been disclosed (JP 2004-204082 A).

Further, an epoxy resin composition that has an excellent balance between a low viscosity holding time and a curing time under constant temperature conditions around 100° C. by using an epoxy resin composition combined with acid anhydride as a curing agent and an organophosphorus compound as a catalyst has been disclosed (WO 2007/125759 A1).

Furthermore, an epoxy resin composition that has a low viscosity and exhibits high heat resistance when formed into a cured resin product by using as a base resin a combination of base alicyclic epoxy and a small amount of phenol novolac epoxy has been disclosed (WO 2009/089145 A1).

The epoxy resin composition disclosed in JP '422 was an epoxy resin composition for filament winding molding, and simultaneously achieved viscosity stability in a resin bath at about 40° C. and heat resistance after curing at 150° C. However, the epoxy resin composition does not have high-speed curability required for molding by the high-cycle RTM method, and for heat resistance, its glass-transition temperature (hereinafter referred to as Tg) was about 150° C., which was insufficient to withstand a painting process of automobile parts.

The epoxy resin composition disclosed in JP '082 is a liquid resin composition that is solid or high-viscosity at normal temperature contemplated for use in semiconductor sealing materials, and the impregnating ability into a reinforcing fiber is not considered. Further, it takes 30 minutes or more to be cured, and the epoxy resin composition does not have high-speed curability.

The epoxy resin composition disclosed in WO '759 has a problem in that the heat resistance after curing was insufficient.

The epoxy resin composition disclosed in WO '145, which was not contemplated to be molded by the high-cycle RTM, exhibited a large viscosity increase during an injection process and has insufficient high-speed curability in a low-temperature range.

As described above, hitherto there has been no epoxy resin composition that is applicable to the high-cycle RTM method and exhibits sufficient heat resistance when cured.

It would therefore be helpful to provide an epoxy resin composition that is excellent in operability in preparation of a resin, is excellent in impregnating ability because a low viscosity is maintained during injection into reinforcing fibers, and cures in a short time at the time of molding, thereby providing a fiber-reinforced composite material that exhibits high heat resistance when cured and has a high surface grade and dimension accuracy even after a painting process, and a fiber-reinforced composite material using the same.

SUMMARY

We thus provide an epoxy resin composition for a fiber-reinforced composite material having the following constitution:

an epoxy resin composition for RTM molding of a fiber-reinforced composite material, including [A] to [D] below, wherein [A]/[B], which is a blend mass ratio of [A] to [B], is in the range of 55/45 to 95/5:
- [A] a multifunctional epoxy resin that is liquid at normal temperature or has a softening point of 65° C. or lower, the multifunctional epoxy resin being at least one selected from phenol novolac epoxy resin, cresol novolac epoxy resin, and triphenylmethane epoxy resin;
- [B] an alicyclic epoxy resin;
- [C] an acid anhydride curing agent;
- [D] a curing accelerator.

In the resin composition, [A] is preferably a phenol novolac epoxy resin that is liquid at normal temperature or has a softening point of 65° C. or lower.

In the resin composition, [C] is preferably selected from hexahydrophthalic anhydride, tetrahydrophthalic anhydride, nadic anhydride, and alkyl substituted types thereof.

The resin composition preferably has a cure index having a specific temperature T that satisfies (a) to (c):

$$0.5 \leq t_{10} \leq 4 \quad \text{(a)}$$

$$0.5 \leq t_{90} \leq 10 \quad \text{(b)}$$

$$1 < t_{90}/t_{10} \leq 3 \quad \text{(c).}$$

In the resin composition, the temperature T is preferably in the range of 90 to 130° C.

In the resin composition, [D] is preferably an organophosphorus compound or an imidazole derivative.

In the resin composition, [D] is preferably an imidazole derivative.

In the resin composition, [D] is preferably an organophosphorus compound.

Further, the fiber-reinforced composite material has the following constitution, that is, a fiber-reinforced composite material obtained by combining and curing the above-described epoxy resin composition for a fiber-reinforced composite material and a reinforcing fiber.

In the fiber-reinforced composite material, the reinforcing fiber is preferably a carbon fiber.

Further, the process of producing the fiber-reinforced composite material has the following constitution:

a process of producing a fiber-reinforced composite material using the above-described epoxy resin composition for RTM molding of a fiber-reinforced composite material and a reinforcing fiber includes steps (i) and (ii):
- (i) the step of performing RTM molding in a mold at 90 to 130° C. for 0.5 to 10 minutes and performing mold release after bringing a glass-transition temperature to 95 to 150° C. and a reaction rate to 50 to 90% to obtain a pre-molded product;
- (ii) the step of post-curing the obtained pre-molded product in a temperature range of 130 to 200° C. to obtain a fiber-reinforced composite material whose glass-transition temperature has been brought to 150 to 220° C. and reaction rate to 90 to 100%.

A fiber composite material that is excellent in operability in preparation of a resin, is excellent in impregnating ability because a low viscosity is maintained during injection into reinforcing fibers, cures in a short time at the time of molding, exhibits high heat resistance when cured, and has a high surface grade and dimension accuracy even after a painting process can be provided with high productivity.

DETAILED DESCRIPTION

First, the epoxy resin composition will be described.

The epoxy resin composition is an epoxy resin composition including [A] a multifunctional epoxy resin that is liquid at normal temperature or has a softening point of 65° C. or lower, the multifunctional epoxy resin being at least one selected from phenol novolac epoxy resin, cresol novolac epoxy resin, and triphenylmethane epoxy resin, [B] an alicyclic epoxy resin, [C] an acid anhydride curing agent, and [D] a curing accelerator. It should be noted that the softening point is a softening temperature measured by the ring and ball method specified in JIS K 7234 (1986).

"Multifunctional epoxy resin" means an epoxy resin having at least three epoxy groups in one molecule, and among multifunctional epoxy resins, at least one selected from phenol novolac epoxy resin, cresol novolac epoxy resin, and triphenylmethane epoxy resin is used as [A]. Further, the multifunctional epoxy resin used as [A] is liquid at normal temperature or has a softening point of 65° C. or lower. Normal temperature generally means 25° C.

Examples of commercially available products of the phenol novolac epoxy resin that can be used as [A] include "jER (registered trademark)" 152, 154 (available from Mitsubishi Chemical Corporation), "EPICLON" (registered trademark) N-740 (available from DIC Corporation), and the like.

Examples of commercially available products of the cresol novolac epoxy resin that can be used as [A] include "EPICLON" (registered trademark) N-660, N-665 (available from DIC Corporation), EOCN-1020, EOCN-102S (available from Nippon Kayaku Co., Ltd.), YDCN-700, YDCN-701 (available from Nippon Steel Chemical CO., LTD.), and the like.

Examples of commercially available products of the triphenylmethane epoxy resin that can be used as [A] include "Tactix" (registered trademark) 742 (available from Huntsman Advanced Materials), EPPN-501H, EPPN-502H (available from Nippon Kayaku Co., Ltd.), and the like.

Above all, the phenol novolac epoxy resin is preferably used as [A] because of its excellent balance between the viscosity of the resin composition and the mechanical properties such as heat resistance and elastic modulus of a cured resin product obtained, and the phenol novolac epoxy resin is preferably contained in the total multifunctional epoxy resins corresponding to [A] in an amount of 60 to 100% by mass.

"Alicyclic epoxy resin" means an epoxy resin having a cyclohexene oxide structure in its molecule.

Examples of commercially available products of the alicyclic epoxy resin [B] include 3,4-epoxycyclohexenylmethyl 3',4'-epoxycyclohexenylcarboxylate ("CELLOXIDE" (registered trademark) 2021P available from DAICEL CHEMICAL INDUSTRIES, LTD.), 1,2,8,9-diepoxylimonene ("CELLOXIDE" (registered trademark) 3000 available from DAICEL CHEMICAL INDUSTRIES, LTD.), ε-caprolactone-modified 3,4-epoxycyclohexenylmethyl-3',4'-epoxycyclohexenylcarboxylate ("CELLOXIDE" (registered trademark) 2081 available from DAICEL CHEMICAL INDUSTRIES, LTD.), bis(3,4-epoxycyclohexylmethyl)adipate (ERL-4299 available from Union Carbide Japan K.K.), and epoxidized butanetetracarboxylic acid tetrakis-(3-cyclohexenylmethyl) modified ε-caprolactone ("EPOLEAD" (registered trademark) GT401 available from DAICEL CHEMICAL INDUSTRIES, LTD.).

The mixing mass ratio of the specific multifunctional epoxy resin [A] to the alicyclic epoxy resin [B] ([A]/[B]) needs to be 55/45 to 95/5, preferably 60/40 to 95/5, and more preferably 60/40 to 90/10. When [A]/[B] is greater than 95/5, the resin composition obtained by mixing has a high viscosity, leading to reduced operability/impregnating ability into reinforcing fibers, and, in contrast, when [A]/[B] is less than 55/45, the time required for curing will be prolonged, leading to reduced productivity. In particular, when performing RTM molding in a low-temperature range of 90 to 130° C., there can be cases where the highly-reactive [A] component is completely consumed and, consequently, the reaction velocity decreases during the molding to prolong the curing time; besides the value of $t_{90}/t_{10}$ increases, and the resin injection time is insufficient.

The acid anhydride curing agent [C] is carboxylic anhydride and more particularly refers to a compound having in one molecule at least one carboxylic anhydride group that can react with an epoxy group of epoxy resin.

The acid anhydride curing agent [C] may be an acid anhydride that has an aromatic ring but does not have an alicyclic structure such as phthalic anhydride, or may be an acid anhydride that has neither an aromatic ring nor an alicyclic structure, such as succinic anhydride. However, it is effective to use an acid anhydride having an alicyclic structure in view of the ease of handling due to being low-viscosity liquid and the heat resistance and mechanical properties of a cured product and, in particular, those having a cycloalkane ring or cycloalkene ring are preferred. Specific examples of such acid anhydrides having an alicyclic structure include hexahydrophthalic anhydride, methylhexahydrophthalic anhydride, methyldihydro nadic anhydride, 1,2,4,5-cyclopentanetetracarboxylic dianhydride, 1,2,3,6-tetrahydrophthalic anhydride, methyl-1,2,3,6-tetrahydrophthalic anhydride, nadic anhydride, methyl nadic anhydride, bicyclo[2,2,2]oct-7-ene-2,3,5,6-tetracarboxylic dianhydride, 4-(2,5-dioxotetrahydrofuran-3-yl)-3-methyl-1,2,5,6-tetrahydrophthalic anhydride, and the like.

Above all, one selected from hexahydrophthalic anhydride, tetrahydrophthalic anhydride, nadic anhydride, and alkyl substituted types thereof is preferably used as the acid anhydride curing agent [C] because of its excellent balance between the viscosity of the resin composition and the mechanical properties such as heat resistance and elastic modulus of a cured resin product obtained.

The epoxy resin composition needs to contain the curing accelerator [D] to exhibit high-speed curability. Specific examples of the curing accelerator [D] include organophosphorus compounds such as tributylphosphine, trioctylphosphine, tricyclohexylphosphine, triphenylphosphine, tribenzylphosphine, tri-o-tolylphosphine, tri-m-tolylphosphine, tri-p-tolylphosphine, tris(4-methoxyphenyl)phosphine, tris(2,6-dimethoxyphenyl)phosphine, diphenylcyclohexylphosphine, p-styryldiphenylphosphine, 1,2-bis(diphenylphosphino)ethane, 1,3-bis(diphenylphosphino)propane, 1,4-bis(diphenylphosphino)butane, tetraphenylphosphonium/tetraphenylborate, and triphenylphosphine/triphenylborane; tertiary amine compounds and salts thereof such as triethylamine, dimethylbenzylamine, 2,4,6-tris(dimethylaminomethyl)phenol, 1,5-diazabicyclo[4.3.0]non-5-ene, 1,8-diazabicyclo[5.4.0]undec-7-ene, phenol salt of 1,8-diazabicyclo[5.4.0]undec-7-ene, phthalate salt of 1,8-diazabicyclo[5.4.0]undec-7-ene, pyridine, 4-dimethylaminopyridine, 3-dimethylaminopropylamine, 3-diethylaminopropylamine, 3-dibutylamino-propylamine, 2-diethylaminoethylamine, 1-diethylamino-4-aminopentane, N-(3-aminopropyl)-N-methylpropanediamine, 1-(2-aminoethyl)piperazine, 1,4-bis(2-aminoethyl)piperazine, 3-(3-dimethylaminopropyl)propylamine, 1,4-bis(3-aminopropyl)piperazine, 4-(2-aminoethyl)morpholine, and 4-(3-aminopropyl)morpholine; imidazoles such as imidazole, 2-methylimidazole, 2-ethylimidazole, 2-undecylimidazole, 2-heptadecylimidazole, 2-phenylimidazole, 1,2-dimethylimidazole, 2-ethyl-4-methylimidazole, 2-phenyl-4-methylimidazole, 1-benzyl-2-phenylimidazole, 1-benzyl-2-methylimidazole, 1-cyanoethyl-2-methylimidazole, and 1-aminoethyl-2-methylimidazole; quaternary ammonium salts such as tetraethylammonium bromide and tetra-butylammonium bromide; organic metal compounds such as zinc octylate, tin octylate, and aluminum-acetylacetone complex; boron compounds such as boron trifluoride and triphenyl borate; and metal halides such as zinc chloride and stannic chloride. Further, latent curing accelerators can also be used. Representative examples thereof include high-melting point dispersive latent accelerators such as high-melting point imidazole compounds, dicyandiamide, and amine-added accelerators obtained by adding amine to an epoxy resin or the like; microencapsulated latent accelerators obtained by coating the surface of an imidazole accelerator, phosphorus accelerator, or phosphine accelerator with a polymer; amine salt latent curing accelerators; high-temperature-dissociative and thermal-cationic-polymerizable latent curing accelerators such as Lewis acid salts and Brønsted acid salts; and the like. These curing accelerators can be used alone or, as appropriate, in combination of two or more thereof.

Above all, organophosphorus compounds and imidazoles are preferably used as the curing accelerator [D] because, at early stages of the curing reaction of the epoxy resin composition, they inhibit the progress of the reaction to prolong the time during which the low viscosity is maintained and, at middle and late stages of the curing reaction, they provide a sufficiently high reaction velocity to shorten the curing time, though the detailed mechanism is not clear. In particular, imidazoles are more preferably used as the curing accelerator [D] because they are able to provide sufficient heat resistance because they are incorporated into a cross-linked structure by the curing reaction. Among the imidazoles, in particular, imidazoles having a substituent in the 1-position are particularly preferably used as the curing accelerator [D] because, compared to other imidazoles, they are able to maintain low viscosity for a longer time at early stages of the curing reaction and sufficiently increase the reaction velocity at middle and late stages of the curing reaction.

Examples of such imidazoles having a substituent in the 1-position include 1,2-dimethylimidazole, 1-isobutyl-2-methylimidazole, 1-benzyl-2-phenylimidazole, 1-benzyl-2-methylimidazole, 1-cyanoethyl-2-methylimidazole, 1-aminoethyl-2-methylimidazole, and the like.

In particular, when the substituent in [C] is a $C_1$-$C_4$ alkyl group as in the case of 1,2-dimethylimidazole or 1-isobutyl-2-methylimidazole, it is advantageous in that the viscosity of the imidazole itself is low and crystallization is inhibited, thereby reducing the viscosity of the resin composition to a low level to increase the ease of handling. Above all, to not increase the viscosity of the composition more than necessary, preferably, imidazoles that have a melting point of 50°

C. or lower, more preferably, imidazoles that have a melting point of 25° C. or lower and are liquid at 25° C. are preferably used.

Specific commercially available products of such imidazoles having a substituent in the 1-position will be listed: examples of commercially available products of 1,2-dimethylimidazole include "CUREZOL" (registered trademark) 1,2DMZ (melting point: 35° C., available from SHIKOKU CHEMICALS CORPORATION); examples of commercially available products of 1-benzyl-2-phenylimidazole include "CUREZOL" (registered trademark) 1B2PZ (melting point: 40° C., available from SHIKOKU CHEMICALS CORPORATION); examples of commercially available products of 1-benzyl-2-methylimidazole include "jERCURE" (registered trademark) BMI12 (viscosity: 23 mPa·s, available from Mitsubishi Chemical Corporation); examples of commercially available products of 1-cyanoethyl-2-methylimidazole include "CUREZOL" (registered trademark) 2MZ-CN (melting point: 53° C., available from SHIKOKU CHEMICALS CORPORATION); and examples of commercially available products of 1-isobutyl-2-methylimidazole include "jERCURE" (registered trademark) IBMI12 (viscosity: 11 mPa·s, available from Mitsubishi Chemical Corporation).

Imidazoles other than such imidazoles having a substituent in the 1-position can also be used. Examples of the imidazoles not having a substituent in the 1-position include 2-methylimidazole, 2-ethyl-4-methylimidazole, 2-undecylimidazole, 2-heptadecylimidazole, 2-phenyl-4-methylimidazole, and the like. Examples of commercially available products of such imidazoles include "CUREZOL" (registered trademark) 2MZ (available from SHIKOKU CHEMICALS CORPORATION), and examples of commercially available products of 2-ethyl-4-methylimidazole include "CUREZOL" (registered trademark) 2E4MZ (available from SHIKOKU CHEMICALS CORPORATION), "jERCURE" (registered trademark) EMI24 (available from Mitsubishi Chemical Corporation), and the like.

The epoxy resin composition preferably has a viscosity at 25° C. of 0.2 to 5 Pa·s. When the viscosity is not more than 5 Pa·s, the viscosity at a molding temperature can be reduced, which shortens the time for injection into a reinforcing fiber substrate, and the cause of unimpregnation can be prevented. When the viscosity is not less than 0.2 Pa·s, the viscosity at a molding temperature is not too low, whereby pits due to air entrainment during the injection into a reinforcing fiber substrate can be prevented from occurring, and unimpregnated regions due to inhomogeneous impregnation can be prevented from occurring.

Such a viscosity can be determined, for example, by measuring the viscosity of the epoxy resin composition immediately after preparation in accordance with the measuring method of ISO 2884-1 (1999) using a cone-plate type viscometer. Examples of measuring apparatuses include Model TVE-30H manufactured by TOKI SANGYO CO., LTD. and the like.

For the epoxy resin composition, the cure index determined by dielectric measurement at a fixed temperature preferably has a specific temperature T, wherein when taking the time until the cure index reaches 10% and 90% as $t_{10}$ and $t_{90}$, respectively, $t_{10}$ and $t_{90}$ satisfy:

$$0.5 \leq t_{10} \leq 4 \tag{a}$$

$$0.5 \leq t_{90} \leq 10 \tag{b}$$

$$1 < t_{90}/t_{10} \leq 3 \tag{c}$$

wherein $t_{10}$ represents the time (min) from the start of measurements at a temperature T until the cure index reaches 10%, and $t_{90}$ represents the time (min) from the start of measurements until the cure index reaches 90%.

The dielectric measurement does not uniquely correspond to viscosity or elastic modulus, but is useful for determining the curing profile of a thermosetting resin that changes from a low-viscosity liquid to a high modulus amorphous solid. In the dielectric measurement, the curing profile is determined from a temporal change in ion viscosity (equivalent resistivity) calculated from a complex dielectric constant measured by applying a high-frequency electric field to the thermosetting resin.

As a dielectric measurement apparatus, for example, MDE-10 Cure Monitor manufactured by Holometrix-Micromet can be used. For the measurement method, first, an O-ring made of Viton® with an inner diameter of 32 mm and a thickness of 3 mm is placed at the under platen of Programmable Minipress MP2000 in the under platen of which a TMS-1-inch sensor is embedded, and the temperature of the press is set at a given temperature T. Next, the epoxy resin composition is poured inside the O-ring, and the press is closed. Then, the temporal change in ion viscosity of the resin composition is monitored. The dielectric measurement is performed at frequencies of 1, 10, 100, 1,000, and 10,000 Hz, and software (EUMETRIC) attached to the apparatus is used to obtain a logarithm (Log σ) of frequency-independent ion viscosity.

The cure index (unit: %) at a time t required for curing is determined by Equation (1). The time until the cure index reaches 10% is taken as $t_{10}$, and the time until reaching 90% as $t_{90}$.

$$\text{Cure index} = (\text{Log } \alpha_t - \text{Log } \alpha_{min})/(\text{Log } \alpha_{max} - \text{Log } \alpha_{min}) \times 100 \tag{1}$$

$\alpha_t$: Ion viscosity at time t (unit: Ω·cm)
$\alpha_{min}$: Minimum value of ion viscosity (unit: Ω·cm)
$\alpha_{max}$: Maximum value of ion viscosity (unit: Ω·cm)

Monitoring the ion viscosity by dielectric measurement is relatively easy even when a curing reaction proceeds rapidly. Furthermore, the ion viscosity can be used for monitoring not only the change in viscosity at early stages but also the progress of the curing reaction because the ion viscosity can be measured also after gelation and has a tendency to increase with the progress of curing and reach saturation upon completion of the curing. The value obtained by normalizing the logarithm of ion viscosity such that the minimum value is 0% and the saturation value (maximum value) is 100% as described above is called a cure index, which is used to describe a curing profile of a thermosetting resin. Using the time until the cure index reaches 10% as an index related to the speed of increase in viscosity at early stages and using the time until the cure index reaches 90% as an index related to the curing time make it possible to describe conditions preferred to achieve a small increase in viscosity at early stages and curing in a short time.

The meaning of the three relations described above will be summarized. $t_{10}$, which is proportional to the time during which the epoxy resin composition is able to flow at a specific temperature T (flowable time), is not less than 0.5 minutes and not more than 4 minutes (relation (a)); $t_{90}$, which is proportional the time at which curing of the epoxy resin composition is almost complete and release from the mold becomes possible (releasable time), is not less than 0.5 minutes and not more than 10 minutes (relation (b)); and the ratio of the releasable time of the epoxy resin composition to the flowable time is larger than 1 and not larger than 3 (relation (c)). In other words, within the range described above, when $t_{10}$ is large, this means that the epoxy resin composition is easily impregnated into a reinforcing fiber substrate, and when $t_{90}$ is small, this means that the epoxy resin composition cures rapidly. Therefore, it is more preferred that $t_{90}/t_{10}$ be small: larger than 1 and not larger than 3.

Considering the balance with molding temperature mentioned below, the molding temperature (heat-curing temperature) of the epoxy resin composition, i.e., the specific temperature T described above is preferably 90 to 130° C. Setting the range of the specific temperature T at a relatively low-temperature range of 90 to 130° C. allows simplification of molding equipment and eliminates the need of heat resistance of subsidiary materials and the like, leading to cost reduction and, at the same time, relaxes the thermal contraction after mold release, whereby a fiber-reinforced composite material with high dimension accuracy and good surface grade can be obtained.

The epoxy resin composition has a glass-transition temperature of 95 to 150° C. and a reaction rate of 50 to 90% after being cured at the specific temperature T, i.e., 90 to 130° C. for 0.5 to 10 minutes, and preferably has a glass-transition temperature of 100 to 145° C. and a reaction rate in the range of 55 to 85%.

When the glass-transition temperature is 95 to 150° C., a molded product can be readily released from the mold without causing strain. When the glass-transition temperature is lower than 95° C., strain occurs at the time of mold release, and the mold release will be difficult. On the other hand, when it is higher than 150° C., cracks occur in the molded product at the time of mold release, and the molded product will have a degraded surface grade.

When the reaction rate is less than 50%, problems are caused in that strain occurs at the time of mold release and that a portion of the resin adheres to the mold. On the other hand, when it is more than 90%, sufficient heat resistance will not be provided even if post-curing is carried out.

In addition, the glass-transition temperature is more preferably 5 to 20° C. higher than the specific temperature T. When the glass-transition temperature is in such a more preferred range, the molded product can be readily released from the mold without causing strain.

The glass-transition temperature can be measured, for example, by DMA. DMA, an abbreviation of Dynamic Mechanical Analysis, is a technique for evaluating a cured resin product obtained for dynamic viscoelasticity at a specific temperature and a specific frequency. In DMA, using a common dynamic viscoelasticity measuring instrument, torsional strain at a given frequency is applied under a given temperature environment to a cured resin product processed into a plate of a given size, and stress generated is detected separately in viscous terms and elastic terms. The Tg is defined by the temperature at the intersection of the tangent to a glassy region and the tangent to a transfer region from a glassy state to a rubbery state in a G' temperature rise chart obtained by measuring storage modulus (G'), a parameter that reflects the elastic terms, at a given temperature rise rate and a given frequency.

The reaction rate can be measured by DSC. DSC, an abbreviation of Differential Scanning calorimeter, is able to detect the exotherm associated with the curing reaction of a resin. Using DSC, the reaction rate can be calculated from Equation (2) by measuring the exotherm of a curing reaction (Q) of a resin composition before the progress of the curing reaction and measuring the exotherm of a curing reaction (Q') of a resin reactant whose reaction rate is desired to be determined:

$$\text{Reaction rate}(\%) = \{(Q-Q')/Q\} \times 100 \quad (2).$$

In the production process, after the step (i) of curing at the specific temperature T, i.e., 90 to 130° C. for 0.5 to 10 minutes to bring the glass-transition temperature to 95 to 150° C. and the reaction rate to 50 to 90%, post-curing (the step (ii)) is performed at a temperature range of 130 to 200° C. to bring the glass-transition temperature to 150 to 220° C. and the reaction rate to 90 to 100%.

When the glass-transition temperature is lower than 150° C., a significant dimensional change can occur in a painting process and the like. On the other hand, when the glass-transition temperature is higher than 220° C., it can result in a fiber-reinforced composite material with a poor surface grade and insufficient mechanical properties.

When the reaction rate is less than 90%, it can result in a fiber-reinforced composite material with insufficient chemical resistance, and changes in properties can occur in the course of usage.

Next, an example of the process for producing a fiber-reinforced composite material using the epoxy resin composition will be described.

The fiber-reinforced composite material is preferably produced by injecting and impregnating the heated epoxy resin composition described above into a reinforcing fiber substrate placed in a molding tool heated to a specific temperature T, and curing the epoxy resin composition in the molding tool.

The temperature at which the epoxy resin composition is heated is determined, in terms of impregnating ability into a reinforcing fiber substrate, by the relationship between the initial viscosity and increase in viscosity of the epoxy resin composition; it is preferably 60 to 90° C., and more preferably 70 to 80° C.

Further, in the process of producing a fiber-reinforced composite material, to provide flexibility to accommodate to molded products of various shapes or sizes, it is preferable to select appropriate conditions depending on the fiber-reinforced composite material of interest. For example, using a molding tool having a plurality of inlets, the epoxy resin composition is injected simultaneously or sequentially with a time interval through the plurality of inlets. Although the number and shape of the inlets is not limited, the inlets are preferably as many as possible to enable the injection in a short time, and for their arrangement, such a position that the flow length of a resin can be reduced depending on the shape of a molded article is preferred.

In terms of the pot life of the resin, the epoxy resin composition used in the process of producing a fiber-reinforced composite material is preferably injected after heating a solution (a) and a solution (b) separately and mixing the solutions using a mixer immediately before injection, the solution (a) containing the specific multifunctional epoxy resin [A] described above and the alicyclic epoxy resin [B] and the solution (b) containing the acid anhydride curing agent [C]. The curing accelerator [D] and other additive components may be added to either the solution (a) or the solution (b), and can be used by mixing with at least one of them in advance.

The injection pressure of the epoxy resin composition is generally 0.1 to 1.0 MPa and, although the VaRTM (Vacuum Assist Resin Transfer Molding) method in which a resin composition is injected into a mold the inside of which is evacuated to vacuum can also be used, it is preferably 0.1 to 0.6 MPa in terms of injection time and economy of equipment. Also, when performing pressurized injection, it is preferable to evacuate the inside of the mold to vacuum before injecting the resin composition because the occurrence of voids can be reduced.

Next, an example of the fiber-reinforced composite material obtained using the epoxy resin composition and a reinforcing fiber will be described.

In the fiber-reinforced composite material, as a reinforcing fiber, glass fibers, aramid fibers, carbon fibers, boron fibers, and the like are suitably used. Among them, carbon fibers are suitably used because a fiber-reinforced composite material that is lightweight and also has excellent mechanical properties such as strength and elastic modulus can be obtained.

The reinforcing fiber may be a staple fiber or a continuous fiber, and these fibers may be used in combination. To obtain a high-$V_f$ fiber-reinforced composite material, a continuous fiber is preferred.

In the fiber-reinforced composite material, the reinforcing fiber may be used in the form of strands, but a reinforcing fiber substrate obtained by processing reinforcing fibers in the form of a mat, fabric, knit, blade, unidirectional sheet, or the like is suitably used. Among them, a fabric is suitably used because of the ease of obtaining a high-Vf fiber-reinforced composite material and excellent handleability.

The ratio of the net volume of a reinforcing fiber to the apparent volume of a fabric is taken as a filling rate of the fabric. The filling rate of the fabric is determined by the equation $W/(1,000 t \cdot \rho_f)$, wherein W is weight per unit area (unit: g/m$^2$); t is thickness (unit: mm); and $\rho_f$ is density of the reinforcing fiber (unit: g/cm$^3$). The weight per unit area and thickness of the fabric are determined in accordance with JIS R 7602 (1995). The filling rate of the fabric is preferably in the range of 0.10 to 0.85, more preferably 0.40 to 0.85, and still more preferably 0.50 to 0.85 because a high-$V_f$ fiber-reinforced composite material is easily obtained when the filling rate of the fabric is high.

For the fiber-reinforced composite material to have a high specific strength or specific modulus, its fiber volume fraction $V_f$ is preferably in the range of 40 to 85%, and more preferably 45 to 85%. The fiber volume fraction $V_f$ of the fiber-reinforced composite material as used herein is a value defined as below and measured in accordance with ASTM D3171 (1999), and refers to a fiber volume fraction in the state after injection of the epoxy resin composition into a reinforcing fiber substrate and curing. In other words, the fiber volume fraction $V_f$ of the fiber-reinforced composite material can be measured from a thickness h of the fiber-reinforced composite material by using Equation (3):

$$\text{Fiber volume fraction } V_f(\%) = (A_f \times N)/(\rho_f \times h)/10 \quad (3)$$

$A_f$: Weight per 1 m$^2$ of one fiber substrate (g/m$^2$)
N: The number of laminated fiber substrates
$\rho_f$: Density of reinforcing fiber (g/cm$^3$)
h: Thickness of fiber-reinforced composite material (test piece) (mm).

When the weight per 1 m$^2$ of one fiber substrate $A_f$, the number of laminated fiber substrates N, or the density of reinforcing fiber $\rho_f$ is not known, the fiber volume fraction of the fiber-reinforced composite material is measured by any of the combustion method, the nitric acid decomposition method, and the sulfuric acid decomposition method in accordance with JIS K 7075 (1991). As the density of the reinforcing fiber used in this case, a value measured in accordance with JIS R 7603 (1999) is used.

A specific method of measuring the thickness h of the fiber-reinforced composite material is not particularly limited as long as it is a method by which the thickness of the fiber-reinforced composite material can be accurately measured, but as described in JIS K 7072 (1991), it is preferable to perform measurements using a micrometer specified in JIS B 7502 (1994) or an instrument having a precision equal to or higher than that of the micrometer. When measurements cannot be made because the fiber-reinforced composite material has a complicated shape, measurements may be made by cutting out a sample (sample having a shape and size sufficient for measurements) from the fiber-reinforced composite material.

One of the preferred examples of the fiber-reinforced composite material is a single plate. Further, other examples of the preferred examples include a sandwich structure in which a single plate-like fiber-reinforced composite material is arranged on both surfaces of a core material, a hollow structure around which a single plate-like structure is wrapped, a so-called canapé structure in which a single plate-like fiber-reinforced composite material is arranged on one surface of a core material, and the like.

Examples of the core material in the sandwich structure and the canapé structure include honeycomb cores made of aluminum or aramid; foam cores of polyurethane, polystyrene, polyamide, polyimide, polyvinyl chloride, phenol resin, acrylic resin, epoxy resin, and the like; woods such as balsa; and the like. Among them, foam cores are suitably used as a core material because a lightweight fiber-reinforced composite material can be obtained.

The fiber-reinforced composite material is lightweight and also has excellent mechanical properties such as strength and elastic modulus. Therefore, it is preferably used, for example, for a structural member and outer panel of airplanes, space satellites, industrial machines, railway vehicles, marine vessels, automobiles, and the like. Further, the fiber-reinforced composite material also has excellent color tone, surface grade, and dimension accuracy; therefore, it is preferably used particularly for automobile outer panel applications.

EXAMPLES

The epoxy resin composition will now be described in more detail by way of example.
(Resin Material)
The following resin materials were used to obtain the resin composition of each Example. Unless otherwise specified, the unit of the content ratio of resin compositions in Tables 1 and 2 means "parts by mass."
1. Epoxy Resins
[A] Multifunctional epoxy resin that is liquid at normal temperature or has a softening point of 65° C. or lower
    "jER" (registered trademark) 154 (available from Mitsubishi Chemical Corporation): phenol novolac epoxy resin, epoxy equivalent weight: 178, liquid at 25° C. YDCN-700-2 (available from Nippon Steel Chemical CO., LTD.): o-cresol novolac epoxy resin, epoxy equivalent weight: 200, softening point: 61° C.
    "Tactix" (registered trademark) 742 (available from Huntsman Advanced Materials): triphenylmethane epoxy resin, epoxy equivalent weight: 160, softening point: 49° C.
[B] Alicyclic epoxy resins
    "CELLOXIDE" (registered trademark) 2021P (available from DAICEL CHEMICAL INDUSTRIES, LTD.): alicyclic epoxy resin, epoxy equivalent weight: 137 "CELLOXIDE" (registered trademark) 3000 (available from DAICEL CHEMICAL INDUSTRIES, LTD.): alicyclic epoxy resin, epoxy equivalent weight: 94
Epoxy resins other than [A], [B]
    "EPICLON" (registered trademark) N-775 (available from DIC Corporation): phenol novolac epoxy resin, epoxy equivalent weight: 190, softening point: 75° C. YD-128 (available from Nippon Steel Chemical CO., LTD.): bisphenol A epoxy resin, epoxy equivalent weight: 189, liquid at 25° C.

ELM434 (available from Sumitomo Chemical Co., Ltd.): amine epoxy resin, epoxy equivalent weight: 120, liquid at 25° C.

[C] Acid anhydride curing agents

"RIKACID" (registered trademark) MH-700 (available from New Japan Chemical Co., Ltd.): methylhexahydrophthalic anhydride "KAYAHARD" (registered trademark) MCD (available from Nippon Kayaku Co., Ltd.): methyl nadic anhydride "RIKACID" (registered trademark) OSA (available from New Japan Chemical Co., Ltd.): octenyl succinic anhydride

[D] Curing accelerators

"CUREZOL" (registered trademark) 1,2-DMZ (available from SHIKOKU CHEMICALS CORPORATION)): 1,2-dimethylimidazole Triphenylphosphine (available from K.I Chemical Industry Co., Ltd.)

N,N-dimethylbenzylamine (available from TOKYO CHEMICAL INDUSTRY CO., Ltd.)

Preparation of Epoxy Resin Composition

Epoxy resins were mixed at blend ratios shown in Tables 1 and 2 to prepare a I solution. An acid anhydride curing agent and a curing accelerator were mixed at blend ratios shown in Tables 1 and 2 to prepare a II solution.

The I solution and the II solution were used to prepare an epoxy resin composition at blend ratios shown in Tables 1 and 2.

Viscosity Measurement of Resin Composition

In accordance with the measurement method of ISO 2884-1 (1994) using a cone-plate type viscometer, the viscosity of an epoxy resin composition immediately after preparation was measured. As an apparatus, Model TVE-30H manufactured by TOKI SANGYO CO., LTD. was used. The rotor used was 1°34'×R24, and the amount of sample was 1 cm$^3$.

Dielectric Measurement

Dielectric measurements were performed to monitor the curing of a resin. As a dielectric measurement apparatus, MDE-10 Cure Monitor manufactured by Holometrix-Micromet was used. An O-ring made of Viton® with an inner diameter of 32 mm and a thickness of 3 mm was placed at the under platen of Programmable Minipress MP2000 in the under platen of which a TMS-1-inch sensor was embedded, and the temperature of the press was set at 110° C. An epoxy resin composition was poured inside the O-ring, and the press was closed. Then, the temporal change in ion viscosity of the resin composition was monitored. The dielectric measurement was performed at frequencies of 1, 10, 100, 1,000, and 10,000 Hz, and attached software was used to obtain a logarithm (Log α) of frequency-independent ion viscosity.

Next, a cure index was determined by the equation (1) described above, and $t_{90}/t_{10}$, a ratio of the time until the cure index reaches 90% ($t_{90}$) to the time until the cure index reaches 10% ($t_{10}$), was determined.

Preparation of Cured Resin Plate

At the under platen of a pressing device, a 2-mm-thick copper spacer with a cutout of a square with 50 mm sides was placed, and the temperature of the press was set at 110° C. An epoxy resin composition was poured into the spacer, and the press was closed. After 10 minutes, the press was opened to obtain a cured resin plate.

Preparation of Post-Cured Resin Plate

The cured resin plate obtained was placed into a hot-air oven at 180° C. and post-cured for 30 minutes to obtain a post-cured resin plate.

Measurements of Glass-Transition Temperature Tg of Cured Resin Plate and Post-Cured Resin Plate A test piece 12.7 mm wide and 40 mm long was cut out from the cured resin plate, and a torsional DMA measurement was performed using a rheometer (ARES manufactured by TA Instruments). The measurement conditions are a frequency of 1 Hz, a measurement temperature range of 30 to 300° C., and a temperature rise rate of 20° C./min. The temperature at an inflection point of the storage modulus G' obtained from the measurement was taken as Tg.

Further, a test piece 12.7 mm wide and 40 mm long was cut out from the post-cured resin plate, and a torsional DMA measurement was performed using a rheometer (ARES manufactured by TA Instruments). The measurement conditions are a frequency of 1 Hz, a measurement temperature range of 30 to 300° C., and a temperature rise rate of 5° C./min. The temperature at an inflection point of the storage modulus G' obtained from the measurement was taken as Tg.

Measurement of Reaction Rate of Cured Resin Plate and Post-Cured Resin Plate

A sample of about 3 mg was collected from a resin composition, and curing exotherm was measured using a DSC (2910 manufactured by TA Instruments). The measurement conditions are a measurement temperature range of 30 to 300° C. and a temperature rise rate of 10° C./min. The area surrounded by a baseline and the curing exotherm curve (ordinate: exotherm, abscissa: temperature) obtained by the measurement was taken as the curing exotherm. The curing exotherm Q of the resin composition was calculated.

The curing exotherm Q' of a cured resin plate and a post-cured resin plate was calculated in a similar manner, and a reaction rate was derived from Equation (2) described above.

Examples 1 to 12

In the manner described above, an epoxy resin composition was prepared with a composition shown in Tables 1 and 2, and a viscosity measurement and a dielectric measurement were carried out. Further, using the epoxy resin composition prepared, a cured resin plate and a post-cured resin plate were prepared in the manner described above, and a glass-transition temperature Tg and a reaction rate were measured.

As shown in Tables 1 and 2, the epoxy resin composition is excellent in mixing operability because the curing agent and the catalyst is a low-viscosity liquid. In addition, the initial viscosity of the resin composition is low, and the flowable time represented by $t_{10}$ is long at a molding temperature (110° C.). Therefore, the epoxy resin composition is excellent in impregnating ability and filling ability into reinforcing fibers. Further, it can be seen that since the releasable time represented by $t_{90}$ is short, the value of $t_{90}/t_{10}$ is not larger than 3, which is effective for reduction in molding time in the molding of a fiber-reinforced composite material.

Further, since the Tg of the post-cured resin plates after heat treatment at 180° C. are in the range of 174° C. to 211° C., the surface grade and dimension accuracy of a molded article can be ensured even after a painting process.

Comparative Examples 1 to 5

In the manner described above, an epoxy resin composition was prepared with a composition shown in Table 2, and a viscosity measurement and a dielectric measurement were carried out. Further, using the epoxy resin composition prepared, a cured resin plate and a post-cured resin plate were prepared in the manner described above, and a glass-transition temperature Tg and a reaction rate were measured.

As shown in Table 2, other epoxy resin compositions are not provided with satisfactory properties. First, in Comparative Example 1, in which an alicyclic epoxy resin is not contained, the composition has a high viscosity and a poor impregnating ability, and the cured products have a low Tg; a molded article will have a poor surface grade and poor dimension accuracy.

Next, Comparative Example 2, in which a multifunctional epoxy resin is not contained, is not suitable for the production of a fiber-reinforced composite material because a curing speed necessary for high-cycle molding is not achieved.

Comparative Example 3, in which a multifunctional epoxy resin having a softening point higher than 65° C. is used, is not suitable for the production of a fiber-reinforced composite material because the composition has a high viscosity and a poor impregnating ability.

In Comparative Example 4, in which a bisphenol A epoxy resin having only two epoxy groups is used, a sufficient curing speed is not achieved, and besides a sufficient heat resistance is not provided because the cured resin plate has a low glass transition point.

In Comparative Example 5, in which an amine epoxy resin is used as a multifunctional epoxy resin, a sufficient curing speed is not achieved, and the cured resin plate has a low Tg, which results in poor operability in mold release of a fiber-reinforced composite material.

In Comparative Example 6, in which an acid anhydride curing agent is not contained, the composition has an extremely high viscosity and is significantly lacking in impregnating ability.

In Comparative Example 7, in which the content of multifunctional epoxy resin is as small as 40% by mass, because the reaction velocity at the latter half of the curing reaction markedly decreases, the curing takes too much time, and besides $t_{90}/t_{10}$ is a rather poor value of 2.8.

As described above, our epoxy resin composition is suitable for molding of a fiber-reinforced composite material and provides a fiber-reinforced composite material with excellent appearance and surface grade in a short time with high productivity, for example, by the RTM method. Further, our epoxy resin composition is excellent also in molding of a large-shaped fiber-reinforced composite material and is suitable particularly for application to automobile parts.

TABLE 1

| | | | Example 1 | Example 2 | Example 3 | Example 4 | Example 5 | Example 6 | Example 7 | Example 8 | Example 9 |
|---|---|---|---|---|---|---|---|---|---|---|---|
| Epoxy resin composition | [A] Multifunctional epoxy resin | jER 154 (phenol novoiac type, liquid) | 95 | 90 | 75 | 60 | 55 | 75 | | 75 | |
| | | YDCN-700-2 (cresol novoiac type, softening point 81° C.) | | | | | | | 75 | | |
| | | Tactix742 (triphenylmethane type, softening point 49° C.) | | | | | | | | 75 | |
| | [B] Alicyclic epoxy resin | CELLOXIDE 2021P | 5 | 10 | 25 | 40 | 45 | 25 | 25 | 25 | 25 |
| | | CELLOXIDE 3000 | | | | | | | | | |
| | Epoxy resins other than [A], [B] | EPICLON N-775 (phenol novoiac type, softening point 75° C.) | | | | | | | | | |
| | | YD-128 (bisphenol A type, liquid) | | | | | | | | | |
| | | ELM434 (amine type epoxy, liquid) | | | | | | | | | |
| | [C] Acid anhydride curing agent | RIKACID MH-700 | 100 | 100 | 100 | 100 | 100 | 100 | 100 | 100 | |
| | | KAYAHARD MCD | | | | | | | | | 100 |
| | | RIKACID OSA | | | | | | | | | |
| | [D] Curing accelerator | 1,2-DMZ | 5 | 5 | 5 | 5 | 5 | | 5 | 5 | 5 |
| | | TPP | | | | | | 7 | | | |
| | | N,N-dimethylbenzylamine | | | | | | | | | |
| Uncured resin properties | | Initial viscosity of resin composition at 25° C. [Pa·s] | 7.1 | 4.8 | 1.0 | 0.22 | 0.20 | 1.2 | 3.5 | 0.85 | 2.2 |
| | | $t_{10}$ at 110° C. [min] | 2.3 | 2.5 | 3.0 | 3.5 | 3.6 | 3.9 | 3.4 | 3.1 | 3.0 |
| | | $t_{90}$ at 110° C. [min] | 5.3 | 5.6 | 6.9 | 8.5 | 8.6 | 8.2 | 7.8 | 6.5 | 9.3 |
| | | $t_{90}/t_{10}$ at 110° C. | 2.3 | 2.2 | 2.3 | 2.4 | 2.4 | 2.1 | 2.3 | 2.1 | 3.1 |
| Cured resin plate properties | | Glass-transition temperature [° C.] | 129 | 127 | 125 | 121 | 120 | 122 | 123 | 122 | 111 |
| | | Reaction rate [%] | 86 | 63 | 71 | 63 | 61 | 68 | 74 | 68 | 57 |
| Post-cured resin plate properties | | Glass-transition temperature [° C.] | 174 | 181 | 191 | 207 | 211 | 185 | 190 | 193 | 198 |
| | | Reaction rate [%] | 99 | 99 | 97 | 96 | 95 | 98 | 96 | 95 | 94 |

TABLE 2

| | | | Example 10 | Example 11 | Example 12 | Comparative Example 1 | Comparative Example 2 | Comparative Example 3 | Comparative Example 4 | Comparative Example 5 | Comparative Example 6 | Comparative Example 7 |
|---|---|---|---|---|---|---|---|---|---|---|---|---|
| Epoxy resin composition | [A] Multifunctional epoxy resin | jER 154 (phenol novoiac type, liquid) | 75 | 75 | 75 | 100 | | | | | 75 | 40 |
| | | YDCN-700-2 (cresol novoiac type, softening point 61° C.) | | | | | | | | | | |

TABLE 2-continued

| | | Example 10 | Example 11 | Example 12 | Comparative Example 1 | Comparative Example 2 | Comparative Example 3 | Comparative Example 4 | Comparative Example 5 | Comparative Example 6 | Comparative Example 7 |
|---|---|---|---|---|---|---|---|---|---|---|---|
| | Tactix742 (triphenylmethane type, softening point 49° C.) | | | | | | | | | | |
| [B] Alicyclic epoxy resin | CELLOXIDE 2021P | 25 | | 25 | 100 | 25 | 25 | 25 | 25 | 25 | 60 |
| | CELLOXIDE 3000 | | | | | | | | | | |
| Epoxy resins other than [A], [B] | EPICLON N-775 (phenol novoiac type, softening point 75° C.) | | | | | | 75 | | | | |
| | YD-128 (bisphenol A type, liquid) | | | | | | | 75 | | | |
| | ELM434 (amine type epoxy, liquid) | | | | | | | | 75 | | |
| [C] Acid anhydride curing agent | RIKACID MH-700 | | 100 | 100 | 100 | 100 | 100 | 100 | 100 | | 100 |
| | KAYAHARD MCD | | | | | | | | | | |
| | RIKACID OSA | 100 | | | | | | | | | |
| [D] Curing accelerator | 1,2-DMZ | 5 | 5 | | 5 | 5 | 5 | 5 | 5 | 5 | 5 |
| | TPP | | | | | | | | | | |
| | N,N-dimethylbenzylamine | | | 5 | | | | | | | |
| Uncured resin properties | Initial viscosity of resin composition at 25° C. [Pa·s] | 7.2 | 0.68 | 1.0 | 14 | 0.15 | 5.6 | 0.5 | 6.9 | >100 | 0.18 |
| | $t_{10}$ at 110° C. [min] | 2.6 | 1.8 | 2.1 | 1.7 | 6.7 | 3.5 | 4.0 | 2.4 | 2.2 | 5.1 |
| | $t_{90}$ at 110° C. [min] | 8.8 | 5.2 | 12.6 | 5.2 | 20.3 | 8.0 | 11.9 | 12.4 | 5.7 | 14.2 |
| | $t_{90}/t_{10}$ at 110° C. | 3.4 | 2.7 | 6.0 | 3.1 | 3.0 | 2.3 | 3.0 | 5.2 | 2.6 | 2.8 |
| Cured resin plate properties | Glass-transition temperature [° C.] | 114 | 125 | 104 | 127 | 88 | 119 | 98 | 95 | 118 | 99 |
| | Reaction rate [%] | 72 | 76 | 52 | 84 | 39 | 56 | 67 | 43 | 80 | 49 |
| Post-cured resin plate properties | Glass-transition temperature [° C.] | 173 | 187 | 171 | 145 | 225 | 223 | 136 | 226 | 159 | 213 |
| | Reaction rate [%] | 97 | 96 | 97 | 100 | 86 | 58 | 99 | 85 | 94 | 97 |

INDUSTRIAL APPLICABILITY

The epoxy resin composition is excellent in operability in preparation of a resin, is excellent in impregnating ability because a low viscosity is maintained during injection into reinforcing fibers, cures in a short time at the time of molding to provide a cured product with high heat resistance, and provides a high-grade fiber-reinforced composite material, and, therefore, a high-grade fiber-reinforced composite material can be provided with high productivity, for example, by the RTM method. This promotes the application of fiber-reinforced composite materials particularly to automotive use, and improved fuel consumption due to further weight saving of automobiles and contribution to reduction in global warming gas emission can be expected.

The invention claimed is:

1. A process of producing a fiber-reinforced composite material with the epoxy resin composition for Resin Transfer Molding (RTM) of a fiber-reinforced composite material comprising [A] to [D] below, wherein [A]/[B], which is a blend mass ratio of [A] to [B], is 55/45 to 95/5:

[A] a multifunctional epoxy resin that is liquid at normal temperature or has a softening point of 65° C. or lower, the multifunctional epoxy resin being at least one selected from the group consisting of phenol novolac epoxy resin, cresol novolac epoxy resin, and triphenylmethane epoxy resin;
[B] an alicyclic epoxy resin;
[C] an acid anhydride curing agent;
[D] an organophosphorus compound or an imidazole having a substitute in its 1-position, and a reinforcing fiber, comprising steps (i) and (ii):
  (i) performing RTM molding in a mold at 90 to 130° C. for 0.5 to 10 minutes and performing mold release after bringing a glass-transition temperature to 95 to 150° C. and a reaction rate to 50 to 90% to obtain a pre-molded product; and
  (ii) post-curing the obtained pre-molded product in a temperature range of 130 to 200° C. to obtain a fiber-reinforced composite material whose glass-transition temperature has been brought to 150 to 220° C. and reaction rate to 90 to 100%.

* * * * *